Figure 1:
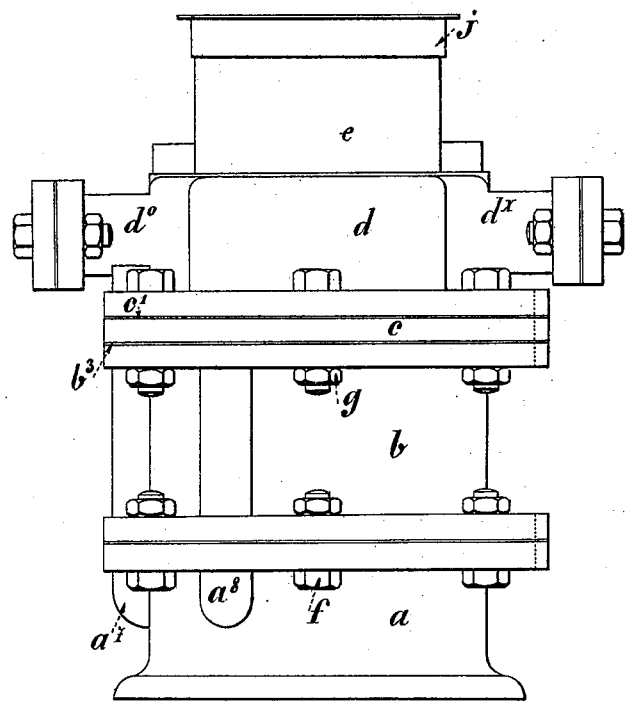

(No Model.) 8 Sheets—Sheet 1.

J. E. A. BEL.
WATER METER.

No. 563,438. Patented July 7, 1896.

Witnesses:
W. E. Bowen
W. C. Pinckney

Inventor:
Jules E. A. Bel,
By J. E. M. Bowen
Atty.

(No Model.)

J. E. A. BEL.
WATER METER.

No. 563,438.

8 Sheets—Sheet 2.

Patented July 7, 1896.

Witnesses:
W. E. Bowen
W. C. Pinckney

Inventor:
Jules E. A. Bel,
By J. E. W. Bowen
Atty.

THE NORRIS PETERS CO., PHOTO-LITHO., WASHINGTON, D. C.

(No Model.) 8 Sheets—Sheet 3.

J. E. A. BEL.
WATER METER.

No. 563,438. Patented July 7, 1896.

Witnesses:
W. E. Bowen
H. C. Pinckney

Inventor:-
Jules E. A. Bel,
By J. E. M. Bowen
Atty.

(No Model.)  8 Sheets—Sheet 4.
J. E. A. BEL.
WATER METER.
No. 563,438. Patented July 7, 1896.
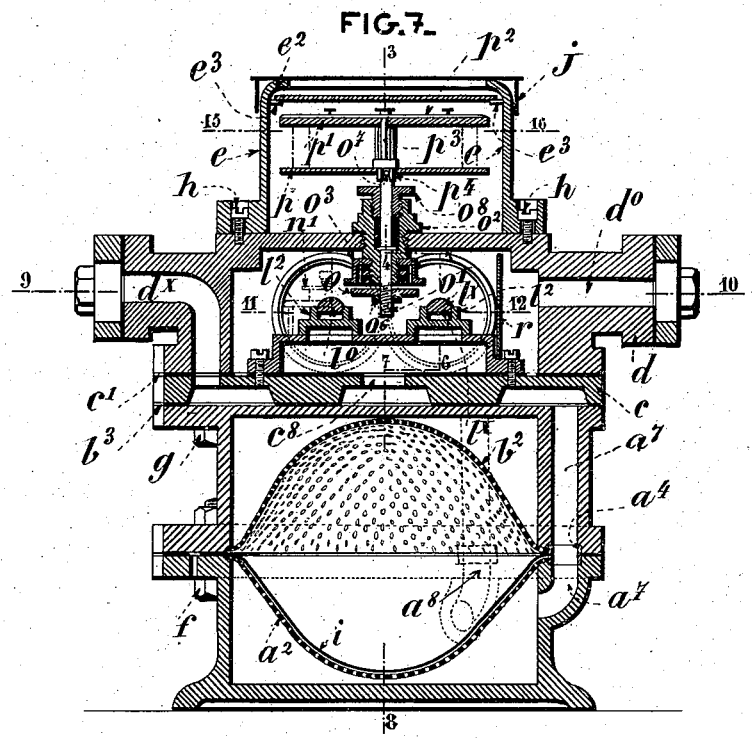
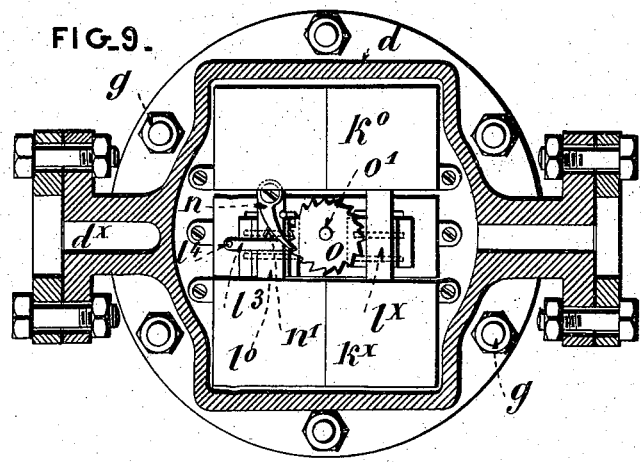
Witnesses:-
W. E. Bowen
H. C. Pinckney
Inventor:-
Jules E. A. Bel,
By J. E. M. Bowen
atty.

(No Model.) 8 Sheets—Sheet 5.
J. E. A. BEL.
WATER METER.
No. 563,438. Patented July 7, 1896.
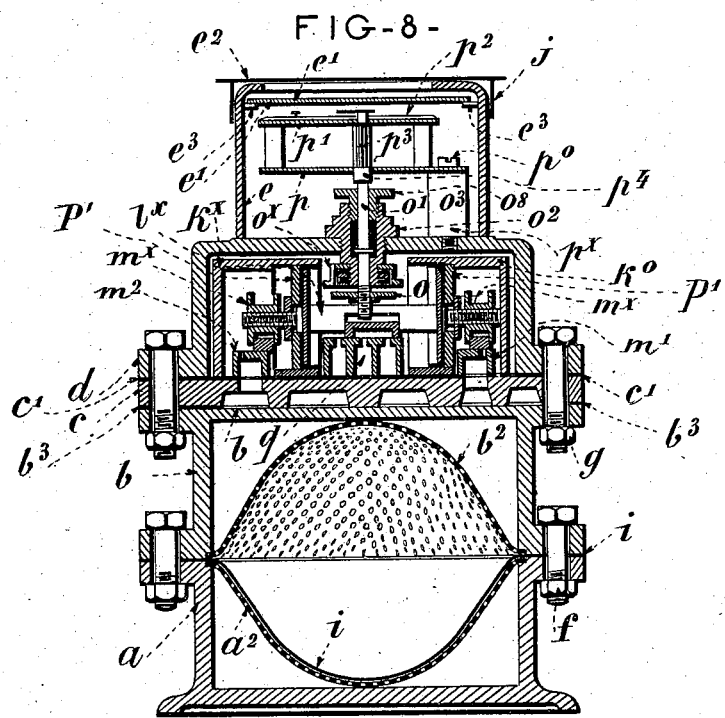
FIG-8-
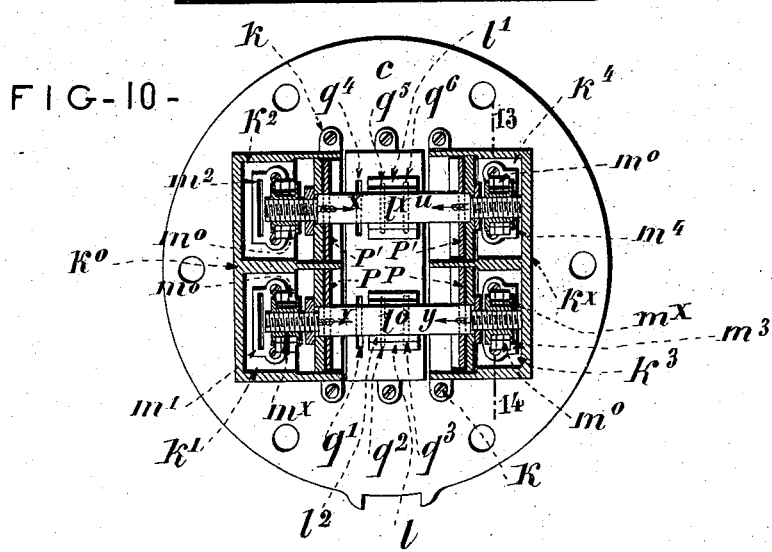
FIG-10-
Witnesses:—
W. E. Bowen
W. C. Pinckney
Inventor:
Jules E. A. Bel,
By J. E. M. Bowen
Atty.

(No Model.) 8 Sheets—Sheet 6.

J. E. A. BEL.
WATER METER.

No. 563,438. Patented July 7, 1896.

Witnesses:—
W. E. Bowen
W. C. Pinckney

Inventor:
Jules E. A. Bel,
By J. E. W. Bowen
Atty (No Model.) 8 Sheets—Sheet 7.
J. E. A. BEL.
WATER METER.
No. 563,438. Patented July 7, 1896.
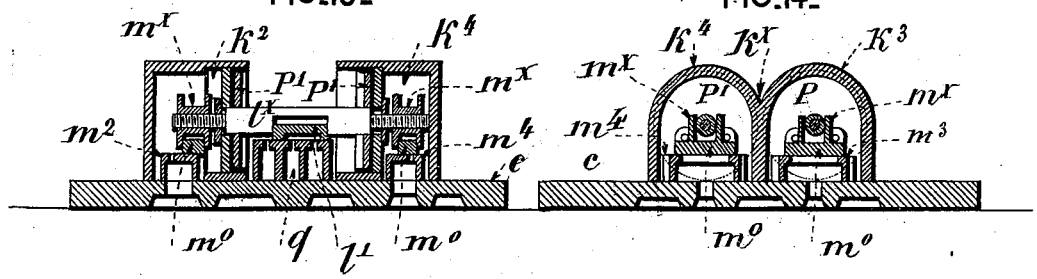
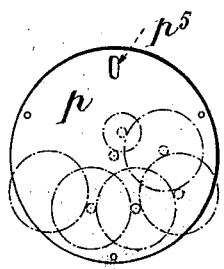
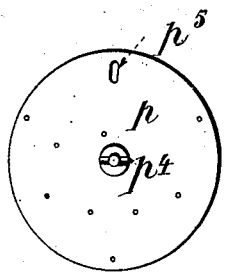
Witnesses:
W. E. Bowen
H. C. Pinckney
Inventor:
Jules E. A. Bel,
J. E. M. Bowen
atty (No Model.)  8 Sheets—Sheet 8.
J. E. A. BEL.
WATER METER.
No. 563,438.  Patented July 7, 1896.
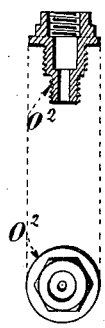
FIG-17-
FIG-19-
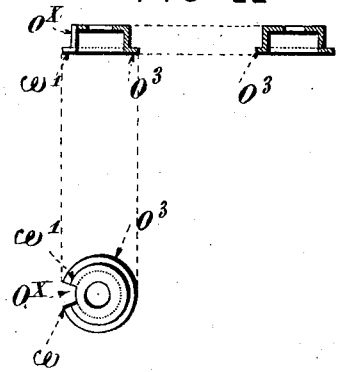
FIG-22-
FIG-18-
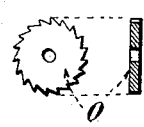
FIG-20-
FIG-21-
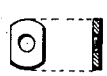
FIG-27-
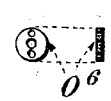
FIG-23-
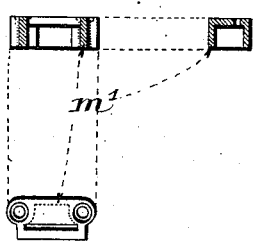
FIG-24-
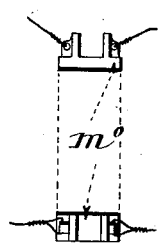
FIG-25-
FIG-28-
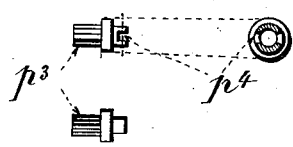
FIG-29
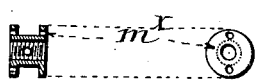
FIG-26-
Witnesses:—
W. E. Bowen
M. E. Pinckney
Inventor:
Jules E. A. Bel,
By J. E. M. Bowen
Atty.
THE NORRIS PETERS CO., PHOTO-LITHO., WASHINGTON, D. C.

UNITED STATES PATENT OFFICE.

JULES EUSÈBE ABDON BEL, OF BARCELONA, SPAIN.

WATER-METER.

SPECIFICATION forming part of Letters Patent No. 563,438, dated July 7, 1896.

Application filed December 13, 1894. Serial No. 531,709. (No model.) Patented in France October 24, 1894, No. 242,354.

*To all whom it may concern:*

Be it known that I, JULES EUSÈBE ABDON BEL, engineer, a citizen of the Republic of France, and a resident of Barcelona, Pasaje Bacardi, Spain, have invented certain new and useful Improvements in Water-Meters, (for which I have obtained Letters Patent of France, No. 242,354, dated October 24, 1894,) of which the following is a specification.

My invention relates to water-meters, and the purposes of the invention are to provide an apparatus which will give absolutely correct results in metering the water, which may be erected readily and methodically, and shall be of small size and weight. Said water-meter, while resembling in its general outlines and construction the apparatus covered by my United States Patent No. 524,411, dated August 14, 1894, contains certain valuable additional and distinguishing features whereby the movements of the water-pistons employed in actuating the distributing slide-valves of the meter are modified and a cushioning resistance is provided for the same as they approach the ends of their strokes, thus guarding against shocks and abrupt movements in the meter. It also contains certain novel details relating more especially to means whereby a close and reliable fit between different sections of the meter-casing may be secured.

In the accompanying drawings I have represented in various principal views and in detail views a water-meter constructed according to my invention.

Figure 3:
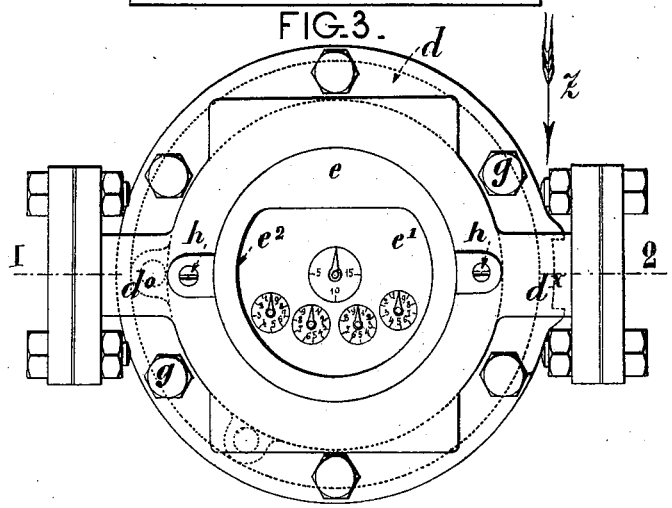
Figure 2:
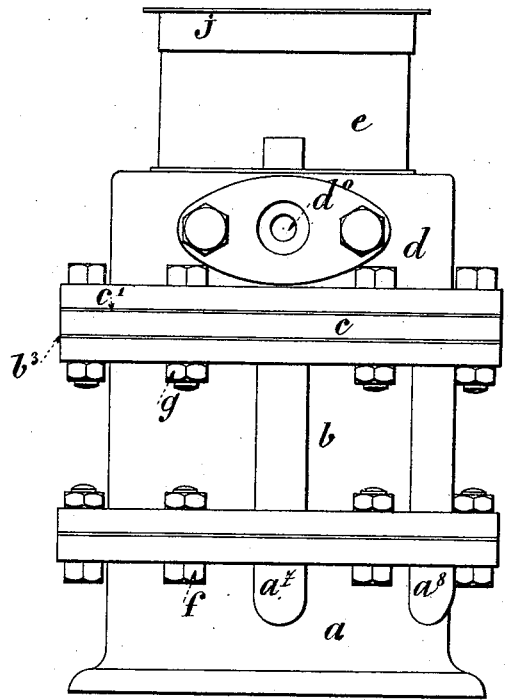
Figure 4:
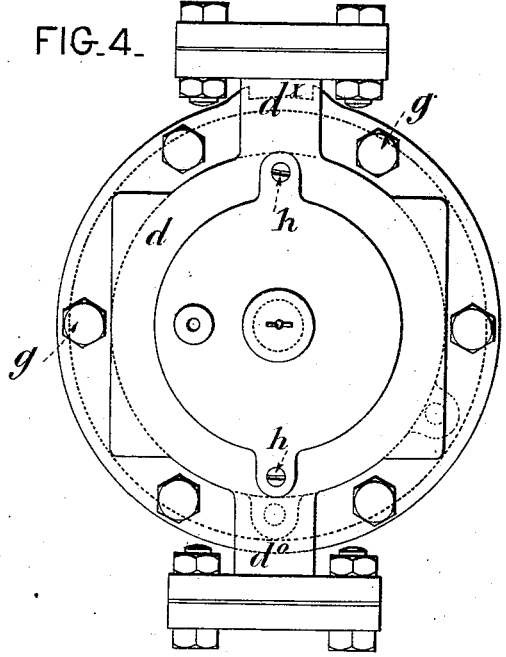
Figure 5:
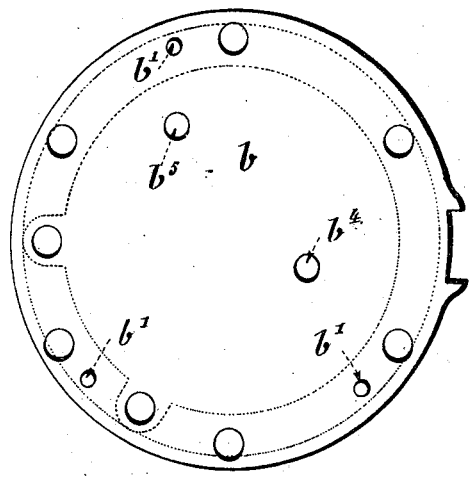
Figure 6:
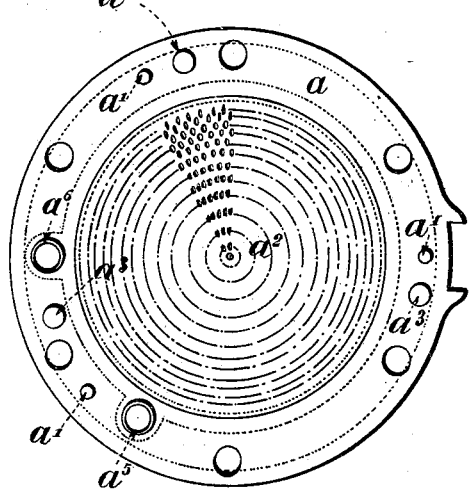
Figure 11:
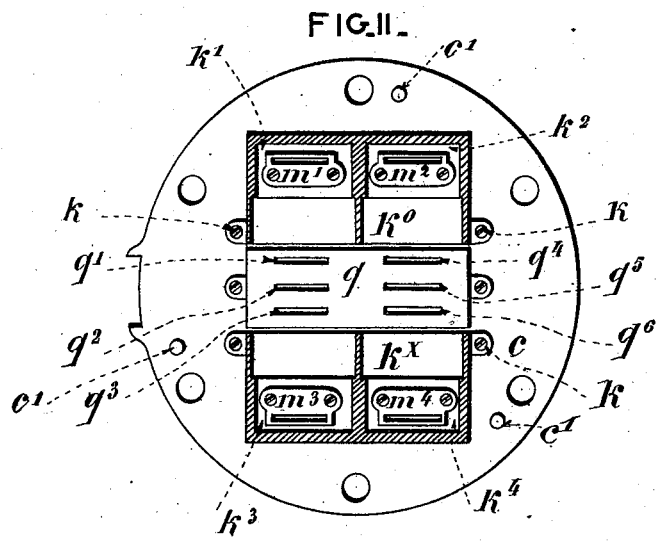
Figure 12:
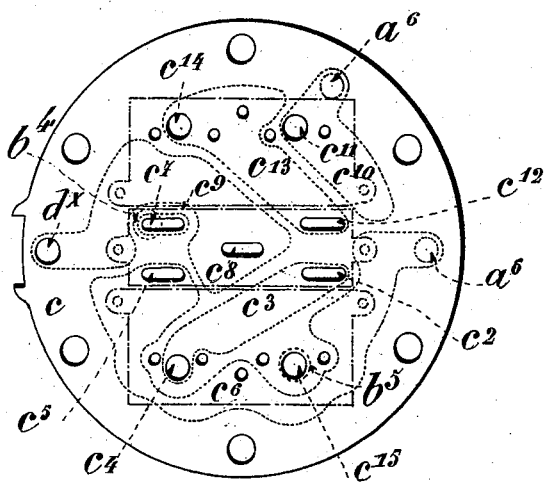

In the drawings, Figures 1 and 2 are respectively a front elevation and a side elevation of the complete apparatus. Fig. 3 is a ground plan of Fig. 1. Fig. 4 is a ground plan of the apparatus, the cap and the registering mechanism being omitted. Fig. 5 is a plan view of that portion of the casing forming the upper part of the measuring device and containing the upper perforated bell. Fig. 6 is a plan view of the base of the meter, forming the lower part of the measuring device and containing the lower perforated bell. Fig. 7 is a vertical section of the meter along line 1 2 in Fig. 3, the observer looking in the direction of the arrow Z, Fig. 3. Fig. 8 is a section along broken line 3 4 5 6 7 8 in Fig. 7. Fig. 9 is a section along line 9 10 in Fig. 7, the distributing mechanism appearing in plan view. Fig. 10 is a section of the distributer along line 11 12 in Fig. 7. Fig. 11 is a horizontal section of the distributer, the valves, slides, and pistons being omitted. Fig. 12 is a plan view of the disk containing the ports for the water. Fig. 13 is a section of part of the apparatus along line 5 6 in Fig. 7. Fig. 14 is a section of part of the apparatus along line 13 14 in Fig. 10. Fig. 15 is a horizontal section of the registering mechanism along line 15 16 in Fig. 7. Fig. 16 is a view of the under side of said mechanism. Figs. 17 to 29 are details to which I refer in the following description.

My meter comprises a device for measuring and a device for distribution. In the measuring device a flexible membrane is made to move under the influence of the pressure of the water, which membrane is inserted between two perforated hemispherical cups or grated bells which limit its movement. The water enters the measuring device alternately on one and on the other side of the membrane through the automatic action of double pistons, which move within the distributing device in the interior of separate cylinders, each containing a distributing slide-valve that alternately closes and opens the ports of a distributing vessel the orifices of which are so arranged that one of the double pistons responds to the movement of the other, and vice versa. The movements of the membrane from one bell to the other effect the measurement of the water which passes through the meter, without such membrane having to lift or to actuate any device whatever in order to produce the changes in the movements of the double pistons and their slide-valves, because such change of movement is produced automatically through the pressure of the water itself which is to be metered.

The registering mechanism is controlled by a single ratchet of one of the double pistons, and which forms a part of a spring-catch of peculiar construction, which answers equally well for the greatest and the smallest discharges.

The casing of my meter consists of five sections *a b c d e*, placed one above the other and cast of bronze or other suitable metal, secured to each other by water-tight joints, and held in position by two sets of bolts $f$ $g$ and by screws $h$, Figs. 3 and 7. The four lower pieces $a$ $b$ $c$ $d$ are held in their relative positions by pins $a'$ $b'$, which are inserted without play into adjoining parts. The base $a$ and the piece $b$ above it together constitute the measuring device—viz., the device which contains the measuring mechanism, which consists of two approximately hemispherical bells or grates $a^2$ $b^2$, between which is confined the flexible membrane $i$. The bells are located within the cylindrical parts $a$ and $b$, the water-tight joint of which is formed by the edge of the membrane itself, confined between the flanges of said parts.

For small meters the bells are preferably made of yellow sheet-brass containing five circular holes of which one is centrally located with reference to the others. The sheet metal is cut into circular disks, to which is afterward given the desired form by chasing. In meters of large size the bells are cast in bronze and the holes made afterward, so as to avoid irregularities; but it will be seen that either of said constructions can be employed in large as well as in small meters.

While the bolts $f$, which connect parts $a$ and $b$, are being tightened I prevent the membrane being crushed or displaced, and also prevent the more or less energetic tightening from affecting the capacity of the measuring device, which must be strictly exact, by providing the flange of the base $a$ with three slight projections $a^3$, which limit and regulate the distance between parts $a$ and $b$ as may be desired. Further, the admission and discharge passages for the water in the lower compartment $a$ of the measuring device are provided interiorly at the elevation of the joint with couplings let into the metal by which as the bolts are being tightened the diaphragm is prevented from flattening out and partly closing said passages.

The parts $c$ and $d$, placed one on top of the other and above the part $b$, form the distributing device. They are joined to each other and to the part $b$ by bolts $g$. The joints are made water-tight by the insertion of washers $b^3$ $c'$, made of leather or rubber.

The casting $c$ of the distributing device is a flat circular disk in which are worked out or cast the different passages and openings through which communication is established between the cylinders and the distributing device and between the same and the compartments of the measuring device, as hereinafter explained. Upon the upper face of disk $c$ is fixedly attached a rectangular chest $q$, which I call the "distributer," and the bottom of which contains two series of three rectangular orifices or ports $q'$ $q^2$ $q^6$, communication between which is prevented by partitions cast in conjunction with said chest, except the two interior ones, $q^2$ $q^5$, between which no means are provided to prevent communication between them.

Symmetrically and on each side of the distributer there are fixedly secured upon the disk $c$, by means of screws, two casings $k^0$ $k^\times$, made of bronze and forming two cylinders $k'$ $k^2$ and $k^3$ $k^4$, within which the double pistons P P and P' P' are adapted to move. The stems $l^0$ and $l^\times$ of said double pistons are dependent as far as their forward-and-backward movement is concerned upon two three-port slide-valves $l$ and $l'$, which for such purpose are provided upon their backs with ribs $l^2$, Fig. 7, by means of which they engage with the piston-rods. Such relation is obtained by means of a shallow notch provided in each stem of a length equal to the length of the slide-valve and of a depth slightly greater than the height of the valve.

To the disk $c$ in the bottom of each cylinder there is screwed a piece $m'$ to the cylinder $k'$, $m^2$ to cylinder $k^2$, $m^3$ to $k^3$, and $m^4$ to the last one, $k^4$. Each of said pieces $m'$ $m^2$ $m^3$ $m^4$ is, Fig. 24, provided with a rectangular perforation, which bears the same letter of reference, equal to the openings in the distributer and which form the seat of a delivery-valve $m^0$, Fig. 25. The four valves $m^0$ are dependent upon the forward-and-backward movement of the piston traveling in the corresponding cylinder. Regulating the position of the valve $m^0$ with reference to the axis of the piston is accomplished by the following means: The end of the piston-rod is screw-threaded. Upon such thread is screwed a screw-tapped drum $m^\times$, Fig. 26, which by means of its flanges engages with the vertical ribs provided on the back of the delivery-valve. After the proper position of the drum has been determined, the same is secured by means of a pin, and for the purpose of convenience in mounting, the slide-valve is attached to the piston-rod by thin metallic wires passing through ears cast integral with the ribs of the slide-valve. Thus the slide-valve is made to follow the movement of the piston, but it is also capable of raising up from its seat without difficulty as the water arrives in the cylinder from below through the opening. It will, however, be seen that without departing from the principle upon which this part of my invention is based I could make the discharge-valves of a construction different from that described above. The essential feature is that the discharge-valves should be so constructed as to act as specified elsewhere, so as to overcome by their operation the blows of the pistons against the cylinder-heads, and that they guard against the main area of the water-passage exceeding a certain limit which is the area of one of the openings in the distributing-chest.

Upon a flat portion of the piston-rod $l^0$ of double piston P P there is pivoted a pawl $n$, Figs. 9 and 28, which a metallic spring $n'$, mounted upon its axis, tends constantly to put in engagement with a notch on a corresponding ratchet-wheel $o$, Fig. 20. For the purpose of preventing the stem $l^0$ of the piston P P from turning around its axis said stem is provided with an arm $l^3$, to the extreme end of which is riveted a pin $l^4$, which comes to rest against the disk $c$ while the opposite end of the arm comes to rest against the rib $l^2$ of slide-valve $l$, Figs. 7 and 9.

To the part $d$ of the casing of the meter there are cast tubes $d^0$ $d^\times$ for admitting and discharging the water. Its bottom is perforated axially, thus providing a passage for the axle $o'$, Fig. 18, of the ratchet-wheel $o$, which actuates the registering mechanism. The joint in this passage is made water-tight by a gland $o^2$.

The following arrangement has for its purpose to facilitate the mounting of the apparatus and simultaneously securing uniform action of the ratchet mechanism. The body $o^2$ of the gland, Fig. 17, extends downward in the form of a screw-threaded elongation upon which a guide-sleeve $o^3$, Fig. 22, is mounted so as to be capable of turning around such elongation independent of the other parts of the device. Such sleeve is held in position by a female screw $o^4$ and a jam-nut $o^5$, Figs. 7 and 21, screwed upon the threaded elongation with the interposition of leather washers. The exterior diameter of the flange of guide $o^3$ is slightly larger than the outer diameter of ratchet-wheel $o$. In the periphery there is provided a vertical notch or recess $o^\times$, which is equal in size to the size of two teeth on the ratchet-wheel. The latter is screwed to the axle $o'$ and maintained in its position by a collar $o^6$, Figs. 7 and 23. $o^8$, Figs. 7 and 19, indicates the collar for the gland. The upper face of the outer part of the ratchet is helicoidal and cut obliquely. The height of the edge at its point is equal to the thickness of the flange of the guide.

When the meter is being put together, the parts $a\ b\ c$ of the casing as well as the cylinders and the pistons being in place, and the device $o^2$ $o^8$ being screwed into part $d$, it is only necessary to place such part directly upon disk $c$, bringing the gudgeons in their proper positions, without paying attention to the positions of catch 1, ratchet-wheel $o$, and guide $o^3$. In raising and lowering the part $d$ for the purpose of putting it in place, the ratchet-wheel $o$ first, then the guide-sleeve $o^3$ through its flange will come to rest against the upper face of catch 1. As the latter is made sloping, the ratchet-wheel and sleeve will in descending push the catch aside, and its edge will come to rest against the vertical side of the flange of the guide, which has a greater diameter than the ratchet-wheel, so that the catch will not engage with the teeth. Then the gland is slackened by about one turn and afterward tightened firmly. In turning the gland in one direction or another the same acts upon the guide $o^3$, which is held frictionally upon its elongation. The catch then necessarily enters the notch $o^\times$ of guide $o^3$ and puts itself in operative contact with the teeth of the ratchet-wheel. If by accident it should be in that position before the tightening of the gland, it will return to such position after the above adjustments have been made. But whatever may be the extent of the displacement of the axle of the pawl and of its relative position, its extremity, at the beginning of the operation, in advancing acts only once upon the guide $o^3$ in its movement while operating upon the lateral vertical face $w$ of its notch, and in also automatically placing the other face, $w'$, of the notch in the desired position, so that such face serves as a guide for the pawl, thereby preventing it from passing over more than one tooth on the ratchet-wheel, while forcing it sidewise at the proper moment.

In order to fully appreciate the importance of the particular construction of the mechanism above described, one must not lose sight of the fact that the play of the pistons being a very limited one and subject to changes in accordance with the delivery, the guide becomes of greatest importance and is very difficult to adjust. I overcome this difficulty by placing the notch of the guide in the desired position automatically and in a simple manner.

The registering mechanism is mounted upon two plates $p$ and $p'$, connected by stay-bolts. The upper one, $p'$, carries the dial $p^2$. The frame of this mechanism is secured by means of a screw $p^0$ upon a vertical post $p^\times$, and it is covered by part $e$. The principal axle $p^3$ passes through the center of the lower plate $p$ and carries a coupling-sleeve $p^4$, provided with two vertical slits placed diametrically opposite each other and intended to receive the key $o^7$, which is forced in position crosswise to the upper end of axle $o'$ of the ratchet-wheel $o$, Fig. 7. In order to place the registering mechanism in position, the key $o^7$ is placed in the slits of sleeve $p^4$, and holding the base of the mechanism horizontal the same is turned until the opening $p^5$, Figs. 15 and 16, reaches the position above post $p^\times$. The screw $p^0$ is then put in place, and finally the cap $e$ is attached by means of screws $h$. The cover of the cap is formed by a glass plate $e'$, held between the flange $e^2$ and riveted pins $e^3$. Above the glass a cap $j$ may be placed.

The system of channels is described below, together with the operation of the apparatus, which is as follows:

The pistons P P and P' P' and the other movable parts of the distributer being in the positions indicated in the drawings, the flow of the water, which enters the device through pipe $d^0$, will produce movement of the same as follows: The water passes through the opening $q^4$ of the distributer and the orifice $c^{12}$ of the disk $c$, follows the channel $c^{13}$, passes out through orifice $c^{14}$, and enters through opening $m'$ in the cylinder $k'$. It forces the piston P of said cylinder in the direction of the arrow $v$, and the slide-valve $l$ therefore closes the orifice $q^3$ at the same time that it uncovers orifice $q'$, (position Fig. 10.) The water under pressure in the distributing device passes through opening $q'$, channel $c^7$ in the disk, and the orifice $b^2$ in the upper compartment of the measuring device. The membrane $i$ descends under the pressure of the water until it again comes to rest against the lower bell $a^2$. In this descending movement the membrane forces the water in the lower compartment in the canal $a^7$, and this water then passes through orifice $a^6$, flows through the canal in the disk $c$, crosses said disk in channel $c^5$, passes through opening $q^3$ under the three-port slide-valve, passes through opening $q^2$, flows along channel $c^8$ in disk $c$, follows the channel $c^9$, and is discharged through outflow-tube $d^\times$. When the membrane has come to rest against the lower bell, and when the upper compartment of the measuring device is full, the water rises through orifice $b^5$, passes across the disk through channel $c^{15}$, and flows through opening $m^4$ in cylinder $k^4$, so as to force piston P' before it, (arrow $u$, Fig. 10.) The opening $q^4$ is then closed by the slide-valve $l'$, while port $q^6$ is opened. In consequence, the water passes through port $q^6$, orifice $c^2$, channel $c^3$, the channel $c^4$, and enters through port $m^3$ into cylinder $k^3$, wherein it moves along before it the piston P in the direction of arrow $y$, Fig. 10. The water then passes through opening $q^6$ in casing $q$ and flows through the opening $c^2$, made in disk $c$ underneath the opening. It follows passage $c^3$ in the under side of said disk and passes through opening $c^4$, which corresponds with opening $m^3$ in the bottom of cylinder $k^3$. The piston P of this cylinder $k^3$ receives thereby pressure in the direction of arrow $y$, Fig. 10, in proportion to the quantity of water discharged and slide-valve $l$ in consequence permits the discharge of a corresponding quantity from opening $q^3$. The flexible membrane $i$ is in its lower position, resting against perforated bell $a^2$. The water contained in the distributing device passes through opening $q^3$, flows through the corresponding opening $c^5$ of the disk containing the channels, follows the channel $c^6$, and passes downward through opening $a^6$ and passage $a^7$ into the lower compartment of the measuring device. It elevates the membrane which thus propels the water contained in the upper compartment. The water so raised passes through opening $b^4$, port $c^7$, and passes out through opening $q'$ in three-port slide-valve $l$. From there it passes through opening $q$ and port $c^8$ in the canal $c^9$ of disk $c$. The latter canal joins the outlet-tube $d^\times$ and the water is thus discharged from the meter. When the flexible membrane $i$, forced along by the water entering the lower compartment, has come to rest against the upper bell and said lower compartment has become filled, the water ascends in the canal $a^7$, passes through opening $a^5$, follows the canal $c^{10}$ cut in the disk $c$, and passes through the orifice $c''$, across the disk and through opening $m^2$ in cylinder $k^2$. The piston P' of said cylinder $k^2$ is forced in the direction of the arrow $x$, Fig. 10. In such movement the slide-valve $l'$, actuated by piston P', covers the opening $q^6$ and uncovers opening $q^4$, (position indicated in the drawings.) At such time all the movable parts have reassumed the positions which they were assumed to have occupied at the beginning. The same series of movements will then continue to go on indefinitely as long as the admission-tube supplies the water and such water can be discharged through the outlet-tube.

In the foregoing I have paid little attention to the valves or slides $m'$ $m^2$ $m^3$ $m^4$ and their functions. These valves do not at all prevent the water from entering the cylinders from below. They therefore have no influence upon the operation while causing the velocity of the flow of water in the cylinders to vary as the pistons follow them therein. The positions and the form of these valves are, in fact, such that the nearer a piston approaches the end of its course the smaller an area of passage will the water find, from which the result is produced that the shocks exerted by the piston-rods against the cylinder-heads are counteracted by the progressive increase of resistance which the incompressible water offers to the movement of the pistons. The use of valves $m'$ $m^2$ $m^3$ $m^4$ in the cylinders is also for the purpose of never permitting the general outflow-section for the water in the meter to be of greater size than a predetermined maximum section, equal to the section of one of the exit-ports of the distributer, while it would happen in the absence of such valves at the time of reversal of the movement, under a great discharge, that the section of the passage would be enlarged abruptly and momentarily. To illustrate the matter, let the pistons P P and P' P' be assumed to be in the positions indicated in the drawings. The two ports $q'$ and $q^4$ are open, but in the meantime the section of the passage is not greater than the section of the port $q'$ because the water does not pass through the other port for the reason that the piston operating within the cylinder $k'$, the valve of which communicates with port $q^4$, is at the end of its course, and that in consequence no water can further enter the cylinder, and therefore none can pass through port $q^4$. Let it now be considered what will happen in the reversal of the movement, when the piston P' of cylinder $k^4$ moves in the direction of arrow $u$. The slide-valve $l'$ then uncovers port $q^6$ and the water passes for a moment through said port and also through that of $q'$. Or, as the quantity of water which passes through port $q^6$ is exactly equal to that which enters into cylinder $k^4$ through valve $m^4$, and as the sum of the sections of passage of port $q^6$ and of valve $m^4$ is absolutely constant and equal to the section of an outlet-port of the distributer, (which results from the relative position and the form of said ports,) the result obtained is that in general, whatever be the relative position of the two three-port slide-valves and the apparent section of the openings for admitting the water, the general operative section of the passage does not exceed that of one of the outlet-ports in the distributing-casing. At each stroke of the pistons P P and P' P' the pawl $n$ moves the ratchet-wheel $o$ one notch forward, and the axle $o'$ of the same transmits the movement through the engagement-pin $o^7$ and coupling-sleeve $p^4$ to the central axle of the registering mechanism. I place at $r$, Fig. 7, on the bottom of the casing containing the cylinders and facing the admission-tube and the surrounding casing a metallic vertical plate, which, while not obstructing the passage of the water, protects the ratchet mechanism against the introduction of a tool through the tube through which the water enters and which at the same time together with the wall of the casing forms a chamber in which impurities contained in the water will be deposited.

I reserve the right to modify the construction of my meter in its main features and its details as far as the same are not essential.

Having now fully described my invention, what I claim, and desire to secure by Letters Patent, is—

1. In a water-meter, in combination with its casing, a membrane, perforated bells for regulating its extreme positions, a distributer communicating with both sides of the membrane, two slide-valves controlling the passage of liquid through the distributer, two pistons actuated by the pressure of the liquid and each connected with one of such slide-valves, water-chambers in communication with the outer faces of said pistons and valves actuated by said pistons and controlling the outflow from said water-chambers, substantially as set forth.

2. In a water-meter, in combination with its casing a membrane, perforated bells for regulating its extreme positions, a distributer communicating with both sides of the membrane, two slide-valves controlling the passage of liquid through the distributer, two pistons actuated by the pressure of the liquid and each connected with one of such slide-valves, water-chambers in communication with the outer faces of said pistons and slide-valves for controlling the outflow from said water-chambers and adapted to be lifted from their seats as the water enters said chambers, substantially as set forth.

3. In a water-meter, in combination with its casing, a membrane, perforated bells for regulating its extreme positions, a distributer communicating with both sides of the membrane, two slide-valves controlling the passage of liquid through the distributer, two pistons actuated by the pressure of the liquid, water-chambers in communication with the outer face of said pistons and means for automatically increasing the resistance of the water in said chambers as the pistons approach the ends of their strokes, substantially as set forth.

4. In a water-meter, in combination with its casing, a membrane, bells for regulating its extreme positions, a distributer carrying the admission-ports to the chamber containing the membrane, and two duplex pistons carrying slide-valves communicating with the ports of the distributer each slide-valve being adjusted to cover alternately two successive ports out of a series of three in communication with the admission-inlet and the discharge-outlet of the meter water-cushioning devices for the pistons and means for automatically regulating their resistance, substantially as set forth.

5. In a water-meter, the combination with a casing containing the distributing device, and a casing containing the measuring device, both provided with corresponding water-passages, and a membrane secured between the same, of bushings countersunk in said casings where said passages meet, substantially as set forth.

6. In a water-meter, the combination with a casing containing the distributing device and a casing containing the measuring device, both provided with corresponding water-passages, and a membrane secured between the same, of stay-pins between said casings for preventing crushing of the membrane, substantially as set forth.

In testimony that I claim the foregoing as my invention I have signed my name, in presence of two witnesses, this 22d day of October, A. D. 1894.

JULES EUSÈBE ABDON BEL.

Witnesses:
GEORGES LAURENT,
EUGÈNE WATTIER.